(12) United States Patent
Wen-Lung

(10) Patent No.: US 6,960,720 B2
(45) Date of Patent: Nov. 1, 2005

(54) LIFT-TYPE POSITIONING STRUCTURE FOR BRACKET OF COMPUTER INTERFACE CARD

(75) Inventor: Yu Wen-Lung, Taipei (TW)

(73) Assignee: Shuttle Inc., Taipei (TW)

( * ) Notice: Subject to any disclaimer, the term of this patent is extended or adjusted under 35 U.S.C. 154(b) by 21 days.

(21) Appl. No.: 10/804,001

(22) Filed: Mar. 19, 2004

(65) Prior Publication Data

US 2005/0205285 A1 Sep. 22, 2005

(51) Int. Cl.[7] .................................. H02G 3/08
(52) U.S. Cl. ..................... 174/50; 174/58; 174/60; 174/17 R; 361/801
(58) Field of Search ................ 174/50, 58, 60, 174/64, 17 R; 248/906; 220/4.02, 3.2; 361/796, 361/797, 752, 801

(56) References Cited

U.S. PATENT DOCUMENTS

| | | | |
|---|---|---|---|
| 6,649,830 B1 * | 11/2003 | Bartlett et al. | 174/50 |
| 6,654,253 B1 * | 11/2003 | DiMarco | 361/730 |
| 6,737,577 B1 * | 5/2004 | Liao et al. | 174/50 |
| 6,744,633 B1 * | 6/2004 | Dials et al. | 361/752 |
| 6,791,027 B1 * | 9/2004 | Nicolai et al. | 174/50 |
| 6,842,349 B2 * | 1/2005 | Wrycraft et al. | 361/796 |
| 6,847,528 B2 * | 1/2005 | Sucharczuk et al. | 361/796 |

* cited by examiner

*Primary Examiner*—Dhiru R. Patel

(57) ABSTRACT

A lift-type positioning structure for a lid of a bracket of a computer interface card havs a housing, a seat member, a lid and a positioning structure. The housing has a receiving slot for receiving the interface card, a rectangular slot over the receiving slot, and a horizontal platform extending perpendicularly from a lower edge of the rectangular slot. The seat member is mounted to the housing at an edge of the rectangular slot. The lid is pivotally connected to the seat member to be lifted up or down. The positioning device is operative to secure the lid at an open position.

8 Claims, 8 Drawing Sheets

LIFT-TYPE POSITIONING STRUCTURE FOR BRACKET OF COMPUTER INTERFACE CARD

BACKGROUND OF THE INVENTION

The present invention relates to a lift-type positioning structure for a lift-type bracket of a computer interface card, and more particular, to a lift-type lid suitable for use in a protruding positioning structure for a bracket of a computer interface card, so as to cover through holes of the computer housing.

The interface card is basically constructed by a circuit board that has a gold finger and an inverse L-shape bracket. The bracket is locked with a window frame structure, which is typically referred as "rear window", by screws. The window frame has at least one or a plurality of slots for accommodating vertical body of the bracket which connectors formed thereon. To comply with the horizontal body of the bracket, the window frame has a horizontal platform for locking the bracket. Therefore, the rear of the housing includes recessed and protruding designs. The former includes a recessed window frame, and the recessed portion constructs the horizontal platform. The latter includes the window frame onto a rear plate of the housing and a horizontal platform extending from the rear plate of the housing. The recessed window frame provides better allness. However, the housing has a larger depth to waste a lot of space. Therefore, the recessed type is more applicable to large housings. The protruding type requires smaller depth and is more applicable to smaller housings.

The computer housing includes the protruding window frame needs to open a through hole on the slot for the horizontal portion of the bracket to extend outside of the housing. Thereby, the bracket can be secured to the window frame. However, to prevent leakage of electromagnetic wave, the through hole has to be covered by a shield. The conventional shield includes a shed place across the through hole and two screws fastening the shed to a back plate of the computer housing. The shed extends outwardly and downwardly to cover both the through hole and the platform of the window frame. This type of shield requires threading and unthreading the screws every time when the interface card is installed in or removed from the computer. It is very inconvenient for assembling and dissembling the interface card, particularly for those who install and remove interface cards into and from a computer frequently. Many of the users will just remove the shields to result in leakage electromagnetic wave. To resolve this problem, the inventor proposed an L-shape lid to cover the through hole. The lid is place over the through hole. By lifting up the lid, the through hole is exposed and unblocked. While the lid is released, the vertical plate of the L-shape lid completely covers the through hole, and the horizontal plate thereof is stacked on the horizontal plate of the bracket and the frame. However, such type of lid still requires fasteners such as screw to be secured to the housing, and the user has to continuously lift the lid allowing the through hole to be exposed.

BRIEF SUMMARY OF THE INVENTION

The present invention provides a lift-type position structure for a bracket of an interface card. The lid for covering a slot of a computer housing can be positioned at a close or open position without additional fastener.

The lift-type positioning structure for a lid of a bracket of a computer interface card comprises a housing, a seat member, a lid and a positioning structure. The housing includes a receiving slot for receiving the interface card, a rectangular slot over the receiving slot, and a horizontal platform extending perpendicularly from a lower edge of the rectangular slot. The seat member is mounted to the housing at an edge of the rectangular slot. The lid is pivotally connected to the seat member to be lifted up or down. The positioning device is operative to secure the lid at an open position.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

These, as well as other features of the present invention, will become apparent upon reference to the drawings wherein.

DETAILED DESCRIPTION OF THE INVENTION

Figure 1:
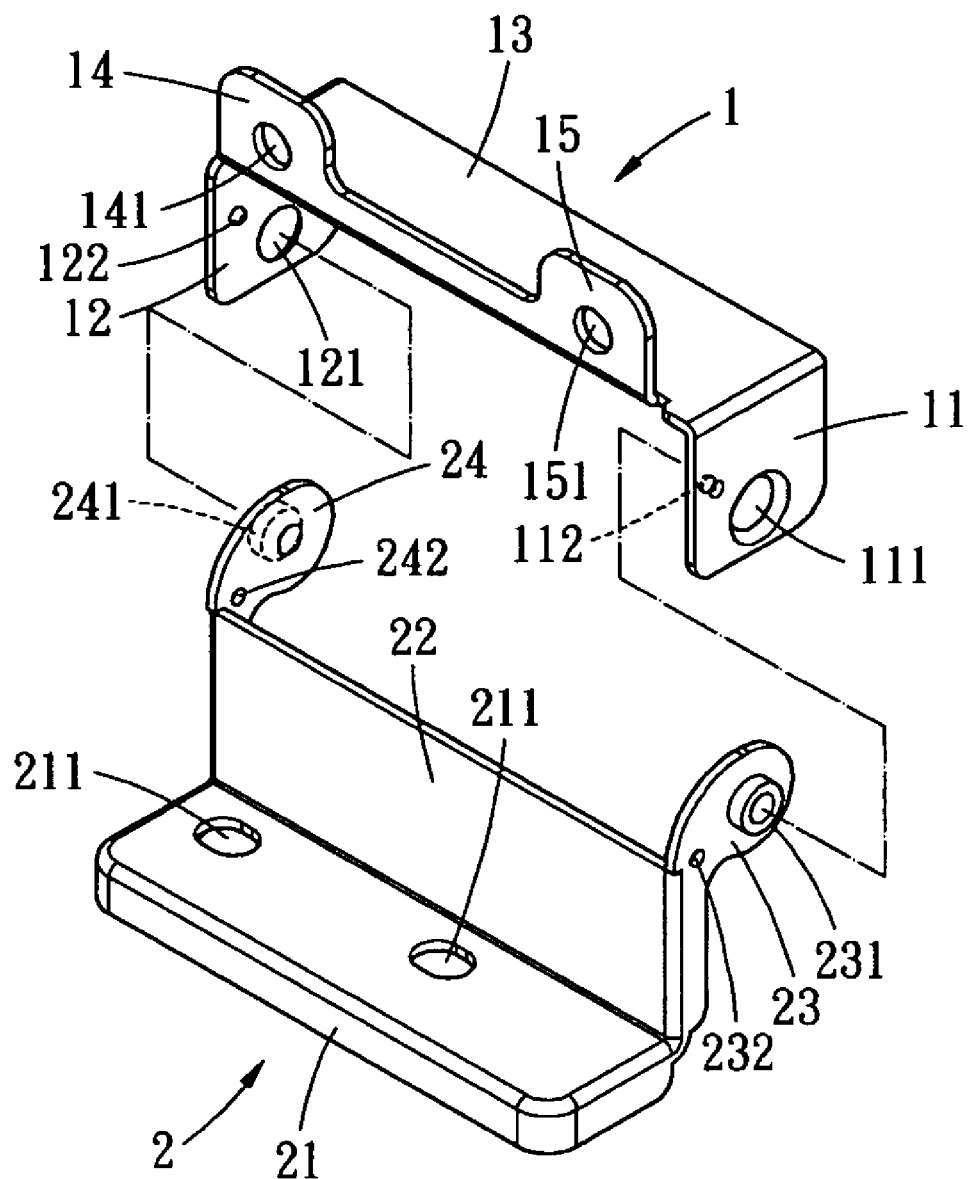
FIG. 1 shows an exploded view of a first embodiment of the present invention.
Figure 2:
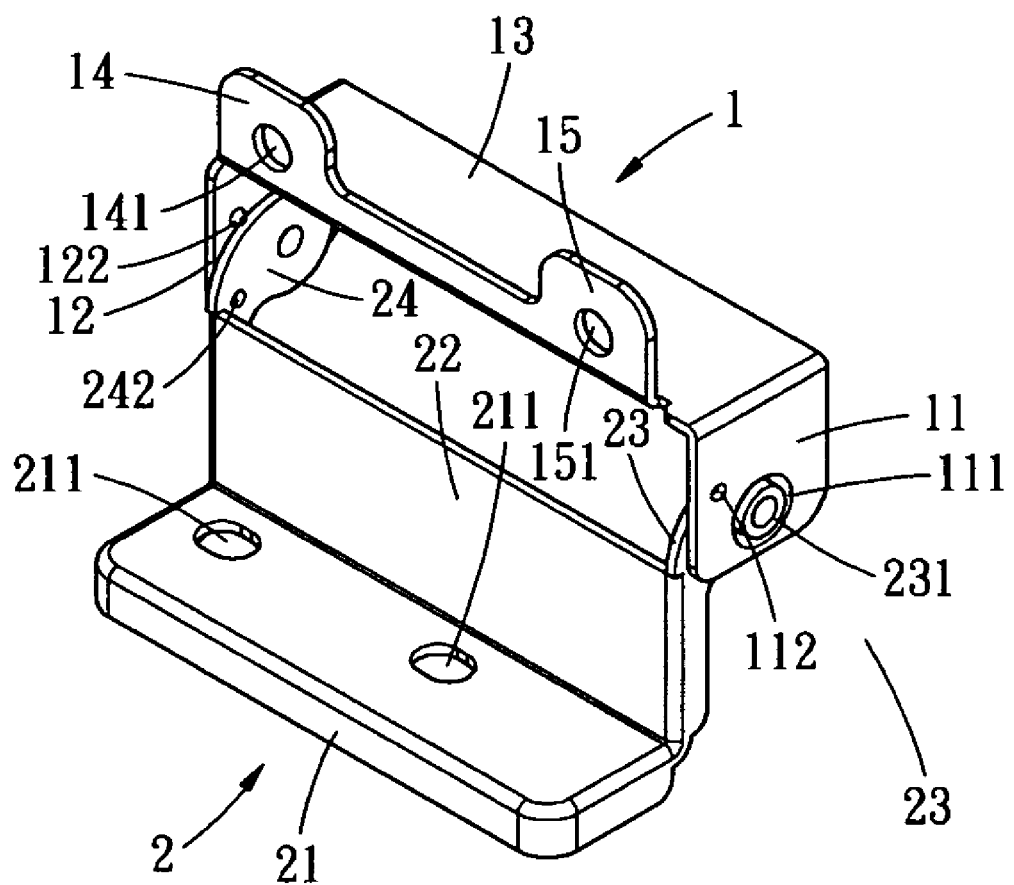
FIG. 2 shows a perspective view of the first embodiment.

Reference will now be made in detail to the preferred embodiments of the present invention, examples of which are illustrated in the accompanying drawings. Wherever possible, the same reference numbers are used in the drawings and the description to refer to the same or like parts.

As shown in FIG. 1, the first embodiment of the present invention includes a seat member 1 and a lid 2. The seat member 1 is to be mounted to a backplane of a computer housing at a through hole penetrating through the backplane. The seat member 1 includes an elongate horizontal plate 13 and two vertical end plates 11, 12 extending perpendicularly from two opposing ends of the elongate plate. The side plates 11 and 12 are perforated with axial apertures 111 and 121 aligned with each other. The end plates 11 and 12 further comprise protruding spots 112 and 122 extending from inner surfaces thereof towards each other. The protruding spots 112 and 122 are located offside of the axial apertures 111 and 121, respectively. The seat member 1 further comprises a vertical side board extending upwardly from an elongate edge of the horizontal plate 13. The vertical side board includes two positioning boards 14 and 15 perforated with holes 141 and 151, respectively. The lid 2 includes an L-shape body constructed by an elongate horizontal plate 21 and an elongate vertical plate 22. The horizontal plate 21 is perforated with two holes 211 allowing interface cards to be secured thereto. The amount of the holes 211 is determined by the number of interface cards to be installed in the computer, and the distance between the spaces is determined according to the required distance between neighboring interface cards. The positioning structure further comprises two connection plates 23 and 24 extending perpendicularly from two top corners of the vertical plate 22 along a vertical direction. The connection plates 23 and 24 include a pair of cams 231 and 241 for pivotally connecting the axial holes 111 and 121 of the seat member 1. The connection plates 23 and 24 may be perforated with holes 232 and 242 allowing the protruding spots 112 and 122 of the end boards 11 and 12 to be inserted therein. Thereby, when the lid 2 is lifted up to a height at which the protruding spots 112 and 122 are aligned with the holes 232 and 242, the insertion of the protruding spots 112 and 122 into the holes 232 and 242 maintains the lifted position of the lid 2. The lid 2 can be easily released by pushing the horizontal plate 21 downwardly.

Figure 3:
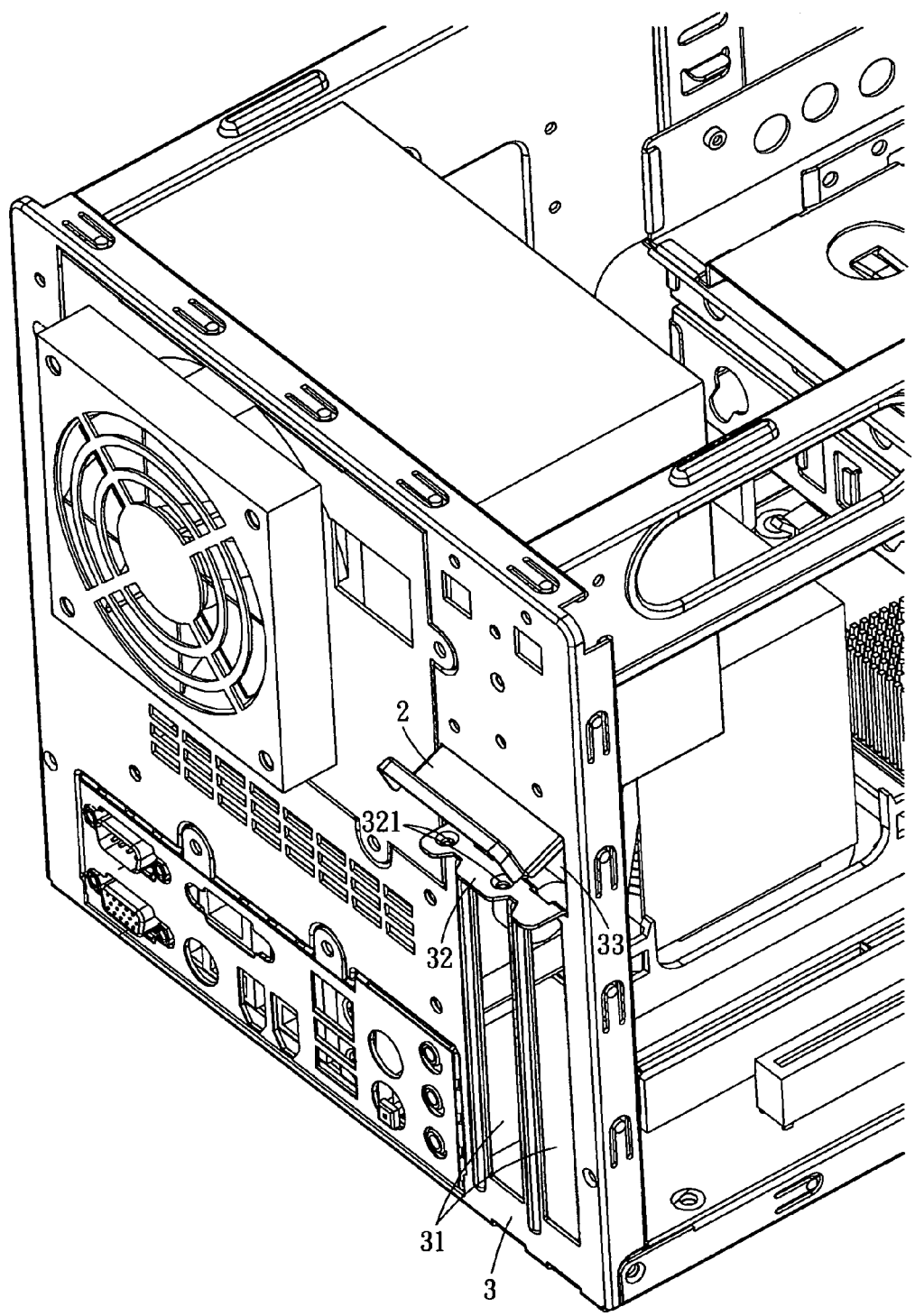
FIG. 3 shows the operation of the first embodiment.
Figure 4:
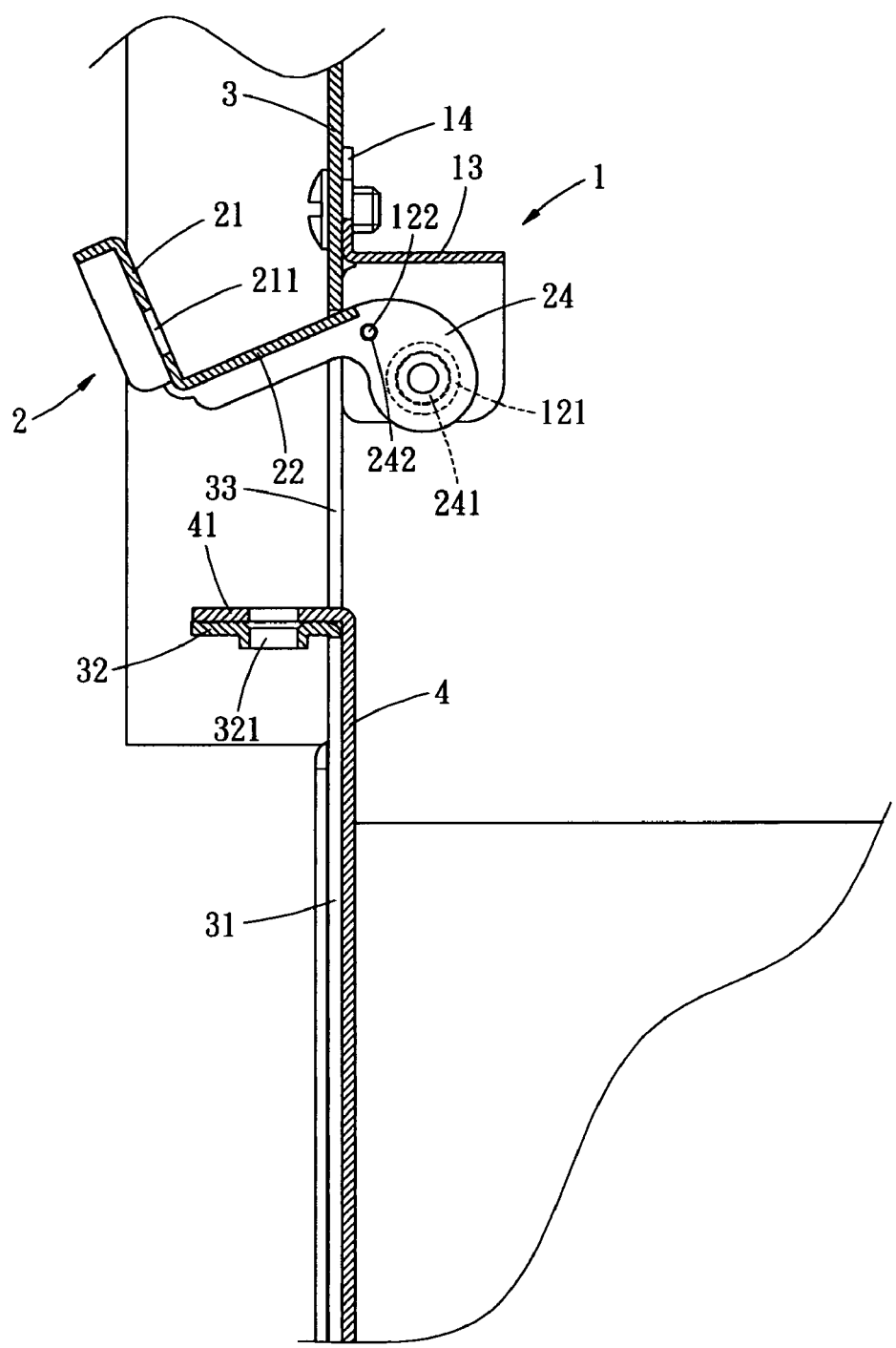
FIG. 4 shows a side view of the first embodiment.
Figure 5:
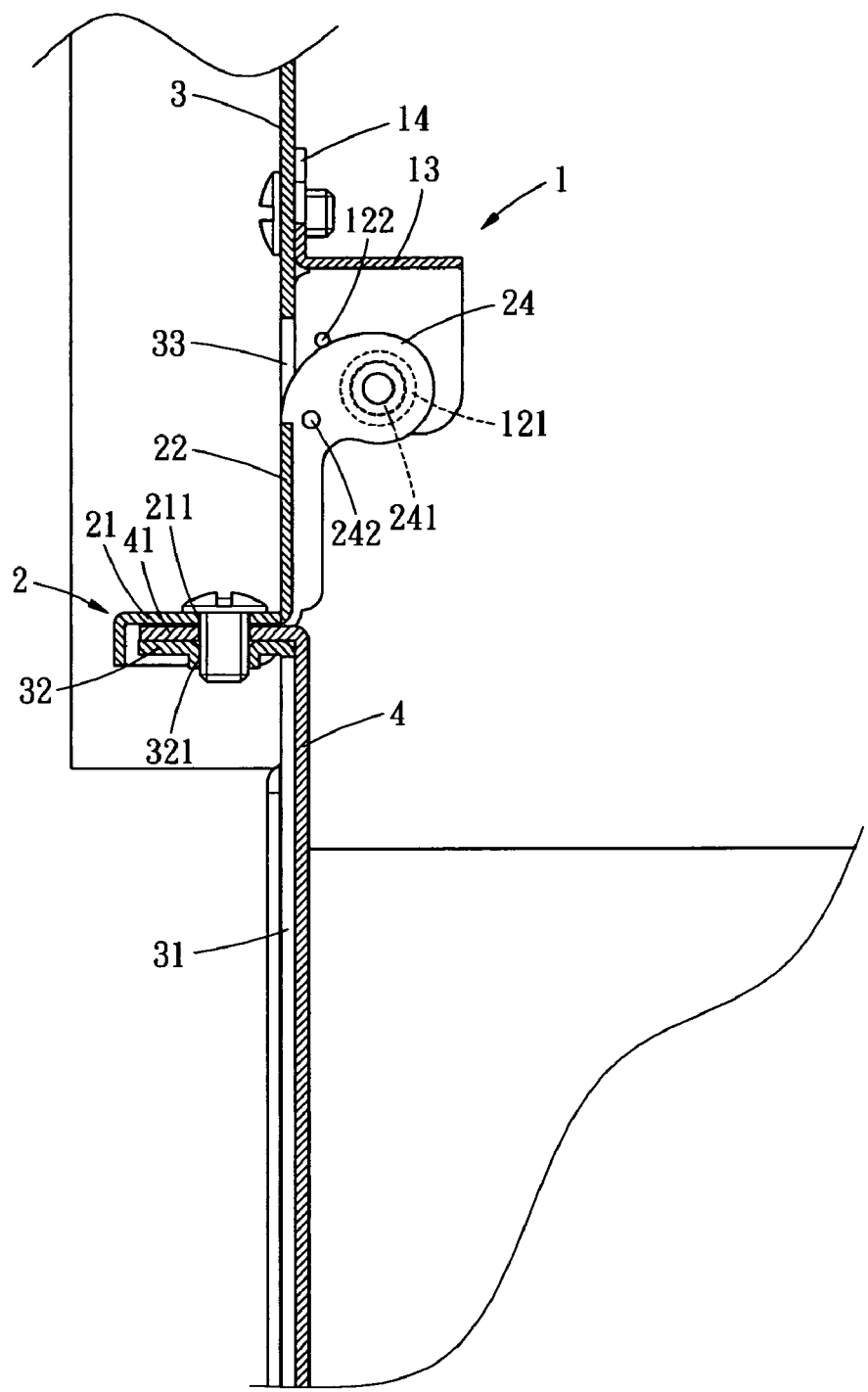
FIG. 5 shows another side view of the first embodiment.

As shown in FIG. 3, the position structure as described above is applied to a backplane 3 of a computer casing. The backplane 3 includes two elongate open vertical slots 31 parallel to each other, brackets 4 (as shown in FIGS. 4 and 5) for receiving interface cards. The backplane 3 is perforated with rectangular slot 33 over the vertical slots 31, and extending from the lower edges of the slot 33 is a horizontal platform 32. Thereby, a protruding positioning structure for an interface card is formed, and the horizontal part 41 of the bracket 4 can extend outside of the housing through the horizontal slot 33 to be stacked over the horizontal platform 32. The horizontal platform 32 is opened with two threaded holes 321 allowing built-in screws of the interface cards to be engaged therewith. The seat member 1 is mounted to the backplane 3 at the edge of the slots 33 using screws or rivets threaded with the positioning holes 141 and 151. FIG. 4 shows the status when the lid 2 is lifted up to a fixed position. As shown, the protruding spots 112 and 122 of the seat member 1 are embedded into the holes 232 and 242. Without any external force, the lid 2 is maintained at the open position. Thereby, the slot 33 is exposed, and the bracket 4 can easily pass through the slot 33. When the interface card is installed, by gently pressing the lid 2 downwardly, the slot 33 is covered by the vertical plate 22 of the lid 2, while the horizontal plate 21 is overlying on the horizontal portion 41 of the bracket 4. In addition, the protruding spots 112 and 122 also have the functions of blocking the edges of the connection boards 23 and 24. Therefore, another positioning function is further provided by the protruding spots 112 and 122.

Figure 6:
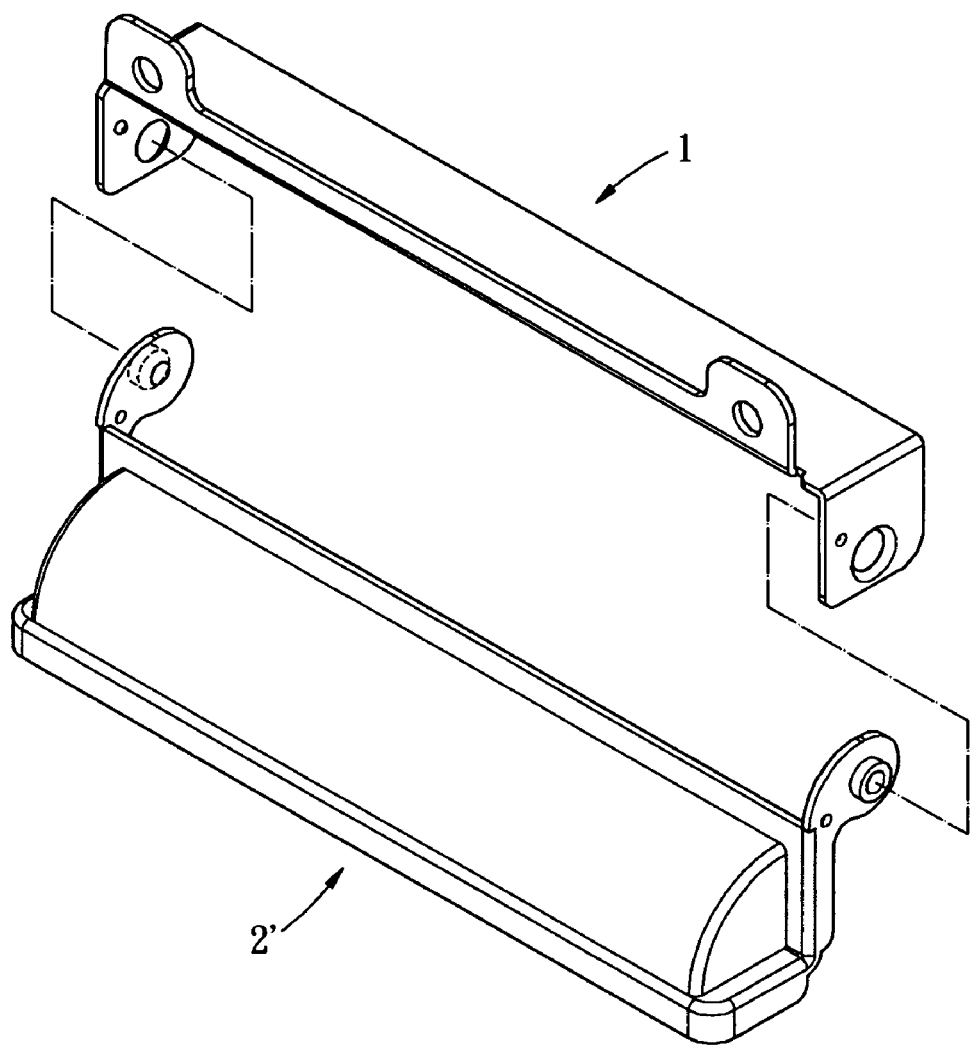
FIG. 6 shows an exploded view of a second embodiment of the present invention.
Figure 7:
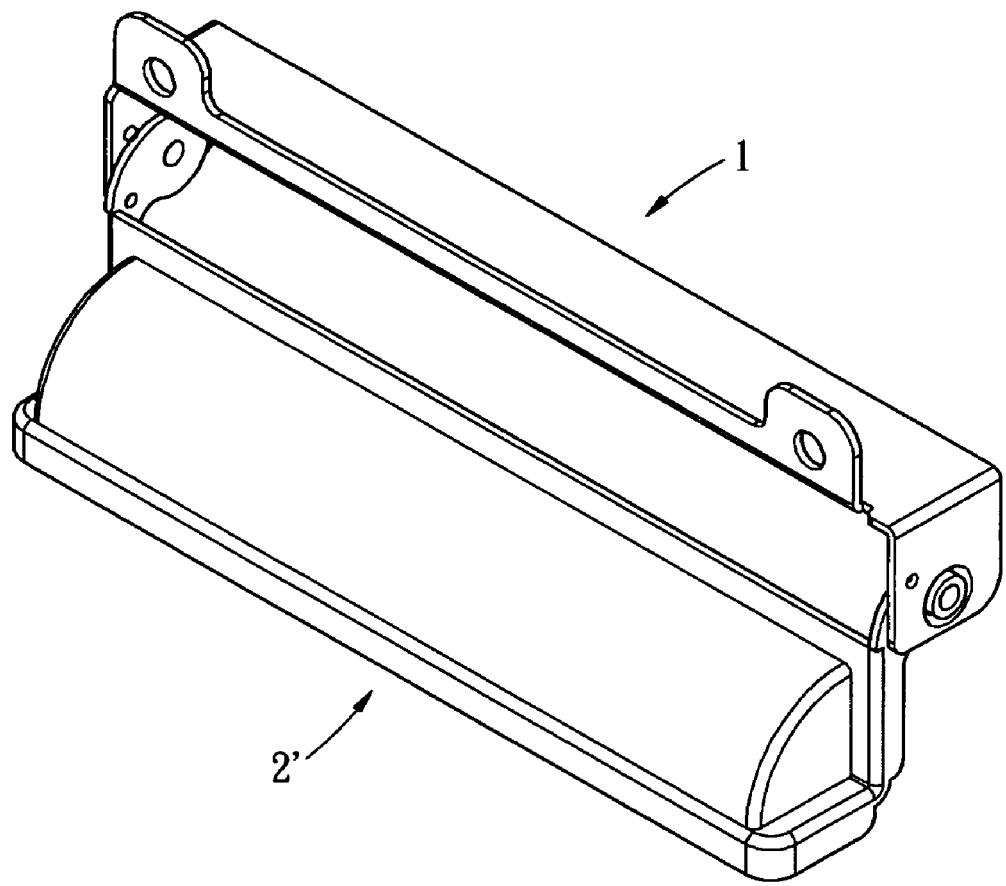
FIG. 7 shows a perspective view of the second embodiment.
Figure 8:
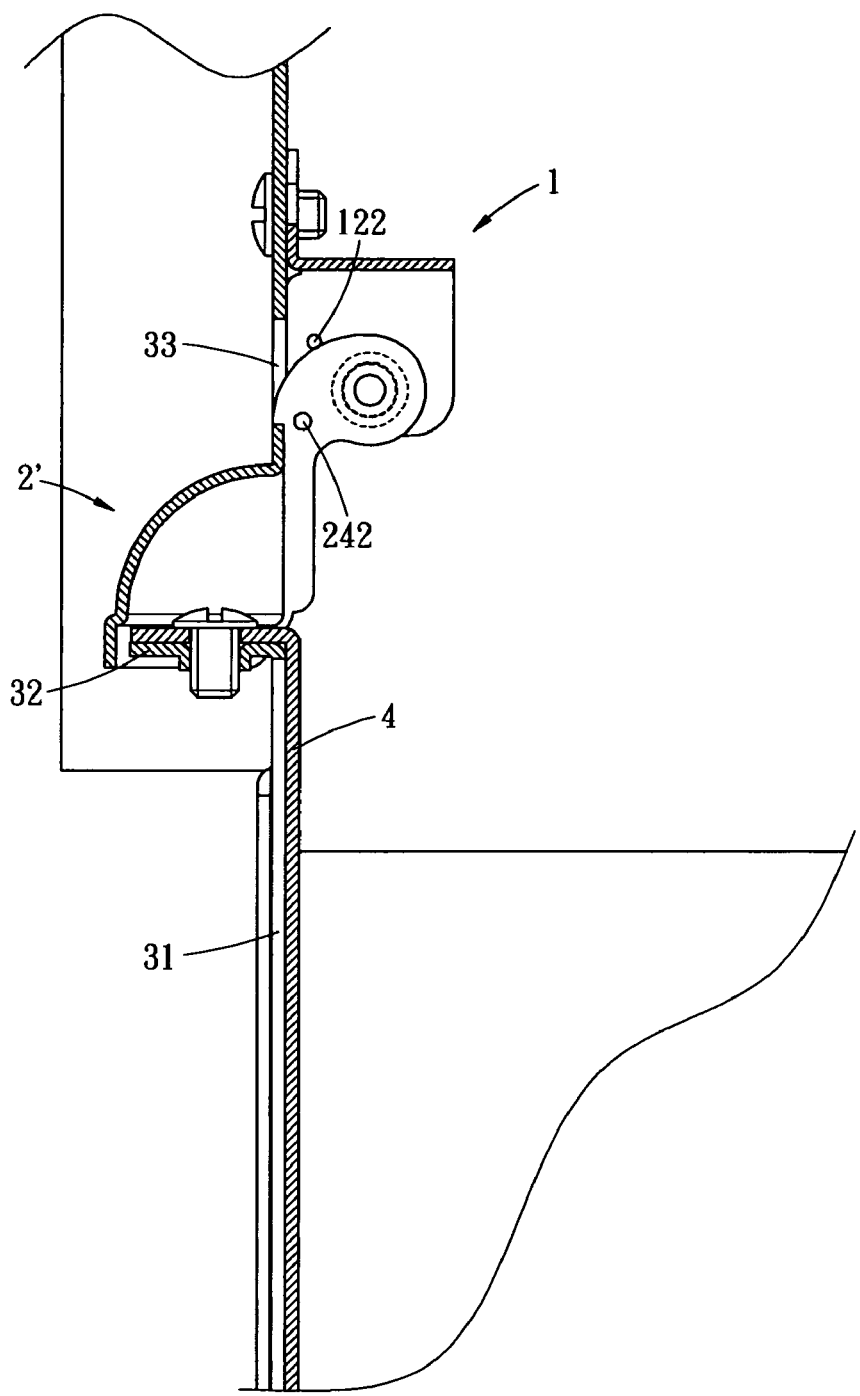
FIG. 8 shows the operation of the second embodiment.

FIGS. 6–8 show a second embodiment of the present invention. As shown, the lid 2' is in the form of a shed, while the remaining parts of the positioning structure is the same as those in the first embodiment. Therefore, during a closing status as shown in FIG. 8, the slot is not directly covered thereby. Instead, the shed covers the horizontal platform 32 to cover the slot. In this embodiment, the lid 2' can be flipped up and down and positioned at the up and down position without using external fasteners.

This disclosure provides exemplary embodiments of the present invention. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A lift-type positioning structure for a lid of a bracket of a computer interface card, comprising:
    a housing, including a receiving slot for receiving the interface card, a rectangular slot over the receiving slot and a horizontal platform extending perpendicularly from a lower edge of the rectangular slot;
    a seat member, mounted to the housing at an edge of the rectangular slot;
    a lid, pivotally connected to the seat member to be lifted up or down; and
    a plurality of protruding spots, operative to secure the lid at an open position.

2. The structure of claim 1, wherein the seat member includes an elongate horizontal plate and two end plates extend perpendicularly and downwardly from two opposing ends of the horizontal plate.

3. The structure of claim 2, wherein the end plates each has an axial hole allowing the lid to be pivotally connected thereto.

4. The structure of claim 3, wherein the seat member comprises two positioning boards extending upwardly from an elongate edge of the horizontal plate, and each of the positioning boards is perforated with a positioning hole.

5. The structure of claim 1, wherein the lid includes an L-shape body constructed by a horizontal plate and a vertical plate, the vertical plate further comprises two connection plates extending away from the two top corners of the vertical plate, and each of the connection plates has a cam to be engaged with the seat member.

6. The structure of claim 5, wherein the horizontal plate of the lid is perforated with one or more than one holes allowing a screw built in an interface to be threaded therein.

7. The structure of claim 1, wherein the seat member includes two protruding spots at two opposing ends thereof, and the lid includes two holes at two opposing ends thereof to be engaged with the protruding spots, so as to position the lid at an open position.

8. The structure of claim 1, wherein the lid is in the form a shed with two vertical connection boards extending from two opposing ends thereof, and each of the connection boards includes a cam to be pivotally connected to the seat member.

* * * * *